(12) United States Patent
Tanigawa et al.

(10) Patent No.: US 10,532,520 B2
(45) Date of Patent: Jan. 14, 2020

(54) FILAMENT WINDING DEVICE

(71) Applicant: Murata Machinery, Ltd., Kyoto-shi (JP)

(72) Inventors: Motohiro Tanigawa, Kyoto (JP); Tadashi Uozumi, Kyoto (JP); Tetsuya Matsuura, Kyoto (JP); Hirotaka Wada, Kyoto (JP); Tatsuhiko Nishida, Kyoto (JP); Shu Ikezaki, Kyoto (JP); Daigoro Nakamura, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 16/053,946

(22) Filed: Aug. 3, 2018

(65) Prior Publication Data
US 2019/0039330 A1 Feb. 7, 2019

(30) Foreign Application Priority Data
Aug. 7, 2017 (JP) .................................. 2017-152211

(51) Int. Cl.
*B29C 70/16* (2006.01)
*B29C 53/80* (2006.01)
(Continued)

(52) U.S. Cl.
CPC .......... *B29C 70/16* (2013.01); *B29C 53/8016* (2013.01); *B29C 53/582* (2013.01); *B29C 53/64* (2013.01); *B29C 53/66* (2013.01); *B29C 53/68* (2013.01); *B29C 53/8066* (2013.01); *B29C 63/10* (2013.01); *B29C 2053/8025* (2013.01); *B29K 2105/103* (2013.01)

(58) Field of Classification Search
CPC .......... B29C 2053/8025; B29C 53/602; B29C 53/64; B29C 53/66; B29C 53/582; B29C 53/70; B29C 63/105; B29K 2105/103; B65H 57/06; B65H 57/16; B65H 81/08
See application file for complete search history.

(56) References Cited

U.S. PATENT DOCUMENTS

2002/0139430 A1 10/2002 Amano et al.
2008/0197229 A1* 8/2008 Uozumi .................. B29C 53/66
242/478.2
(Continued)

FOREIGN PATENT DOCUMENTS

JP 11-245309 A 9/1999
JP 2004-314550 A 11/2004
(Continued)

*Primary Examiner* — Emmanuel M Marcelo
(74) *Attorney, Agent, or Firm* — DLA Piper LLP (US)

(57) ABSTRACT

A helical winding unit includes a plurality of guides arrayed in a peripheral direction of a liner, and adapted to guide each of a plurality of fiber bundles supplied to the helical winding unit to the liner, and an opening member arranged downstream of the plurality of guides in a travelling direction of the fiber bundle, and including an inner peripheral surface for forming a hole, through which the plurality of fiber bundles are inserted from one side to the other side in the axial direction. A plurality of opening surfaces on which the plurality of fiber bundles travel while making contact are formed on the inner peripheral surface of the opening member, and a cross-sectional shape orthogonal to the axial direction of each opening surface is linear.

6 Claims, 10 Drawing Sheets

(51) Int. Cl.
  *B29C 53/64* (2006.01)
  *B29K 105/10* (2006.01)
  *B29C 53/66* (2006.01)
  *B29C 53/58* (2006.01)
  *B29C 53/68* (2006.01)
  *B29C 63/10* (2006.01)

(56) References Cited

U.S. PATENT DOCUMENTS

| | | | |
|---|---|---|---|
| 2009/0038759 A1* | 2/2009 | Uozumi | B29C 53/602 156/425 |
| 2009/0126875 A1 | 5/2009 | Uozumi et al. | |
| 2009/0314872 A1* | 12/2009 | Uozumi | B29C 53/8016 242/410 |
| 2013/0068873 A1* | 3/2013 | Tanigawa | B21C 47/14 242/439.5 |
| 2013/0248637 A1* | 9/2013 | Tanigawa | B29C 63/08 242/443 |
| 2013/0256447 A1* | 10/2013 | Tanigawa | B29C 53/602 242/419.1 |
| 2014/0224918 A1* | 8/2014 | Tanigawa | B65H 59/28 242/419.4 |
| 2015/0048195 A1* | 2/2015 | Tanigawa | B29C 53/602 242/474 |
| 2015/0053808 A1* | 2/2015 | Tanigawa | B29C 53/602 242/430 |
| 2015/0266232 A1* | 9/2015 | Tanigawa | B29C 53/602 242/419.1 |
| 2015/0283753 A1* | 10/2015 | Hatta | B29C 53/562 156/475 |

FOREIGN PATENT DOCUMENTS

| | | |
|---|---|---|
| JP | 2010-005831 A | 1/2010 |
| JP | 2013-063592 A | 4/2013 |

* cited by examiner

FILAMENT WINDING DEVICE

CROSS-REFERENCE TO RELATED APPLICATIONS

This application claims priority of JP 2017-152211, filed on Aug. 7, 2017, the subject matter of which is incorporated herein by reference in its entirety.

TECHNICAL FIELD

This disclosure relates to a filament winding device adapted to wind a fiber bundle around a liner.

BACKGROUND

Japanese Unexamined Patent Publication No. 2004-314550 discloses a filament winding device adapted to wind a plurality of fiber bundles around a liner. The filament winding device includes a supporting section adapted to rotatably support a liner and be movable in an axial direction of the liner, and a helical head adapted to carry out helical winding (winding a fiber bundle in a direction substantially parallel to the axial direction of the liner) on the liner. The helical head includes a plurality of fiber bundle guides adapted to guide each of the plurality of fiber bundles to the liner, and a spreading guide having an inner peripheral surface that spreads (i.e., opens) a width of the plurality of fiber bundles guided by the plurality of fiber bundle guides. The inner peripheral surface of the spreading guide has a circular shape when seen from the axial direction. The fiber bundle travels while making contact with the inner peripheral surface of the spreading guide to be rubbed and opened by the inner peripheral surface of the spreading guide.

As described in Japanese Unexamined Patent Publication No. 2004-314550, if the inner peripheral surface of the spreading guide has a circular shape (i.e., curved line across the entire periphery), the fiber bundle makes contact with a circular arc shaped portion. Hence, the fiber bundle is less likely to become flat even if rubbed and opened and is less likely to spread in the width direction (peripheral direction of the inner peripheral surface). Thus, when the plurality of fiber bundles are wound around the liner, a gap in a peripheral direction easily forms between the fiber bundles and the strength of the liner may lower.

It could therefore be helpful to enable the width of the fiber bundle to be easily spread at the time of opening.

SUMMARY

We Thus Provide:

A filament winding device includes a supporting section adapted to rotatably support a liner and be movable in an axial direction of the liner; and a helical winding head adapted to helical wind a plurality of fiber bundles on the liner moving in the axial direction while rotating; wherein the helical winding head includes, a plurality of fiber bundle guides arrayed in a peripheral direction of the liner, and adapted to guide each of a plurality of fiber bundles supplied to the helical winding head to the liner, and an opening member arranged downstream of the plurality of fiber bundle guides in a travelling direction of the fiber bundle, and including an inner peripheral surface for forming a hole, through which the plurality of fiber bundles are inserted from one side to the other side in the axial direction; a plurality of opening surfaces to which the plurality of fiber bundles travelling from the one side to the other side in the axial direction make contact are formed on the inner peripheral surface of the opening member; and a shape of a cross-section orthogonal to the axial direction of each opening surface is linear.

The plurality of fiber bundles may be respectively guided to the liner through the plurality of fiber bundle guides and the plurality of opening surfaces of the opening member. When the liner passes the helical winding head while rotating, the fiber bundle travelling from one side to the other side in the axial direction is opened by making contact with the opening surface and wound around the liner. The cross-sectional shape orthogonal to the axial direction of the opening surface is linear. Hence, the fiber bundle brought into contact with the opening surface while travelling in the axial direction can be flattened, and each fiber bundle can be greatly spread in the width direction. Therefore, the width of the fiber bundle can be easily spread at the time of the opening.

In the filament winding device described above, the inner peripheral surface has a polygonal shape when seen from the axial direction; each side of the polygon configures each opening surface; and a number of the plurality of opening surfaces is equal to a number of the plurality of fiber bundle guides.

Each side of the polygon formed in the inner peripheral surface may configure each opening surface. Hence, the entire inner peripheral surface can be utilized as the opening surface. Thus, the opening surface can be made large as much as possible in the peripheral direction, and the fiber bundle can be spread as much as possible at the time of the opening. Moreover, as the number of opening surfaces and the number of fiber bundle guides are equal, the plurality of opening surfaces and the plurality of fiber bundles can be corresponded one on one. Thus, one fiber bundle can be rubbed with one opening surface. Therefore, the plurality of fiber bundles can be lined without forming a gap in the peripheral direction of the inner peripheral surface, and the plurality of fiber bundles can be easily wound around the liner evenly. Furthermore, as the plurality of fiber bundles do not need to be commonly rubbed with one opening surface, the fiber bundles can be suppressed from interfering with each other.

In the filament winding devices described above, each opening surface has a curved shape in which a distance to a center in a radial direction of the inner peripheral surface becomes smaller from the one side toward the other side in the axial direction and is convex toward the center in the radial direction.

If the opening surface has a corner, the fiber bundle may be rubbed at the corner and may damage. The travelling fiber bundle can be smoothly laid along the opening surface having a curved shape convex toward the center in the radial direction in the axial direction. Therefore, the damage of the fiber bundle can be suppressed.

In the filament winding devices described above, a regulating portion adapted to regulate movement of the fiber bundle in the peripheral direction is provided between two of the opening surfaces adjacent to each other in the peripheral direction.

The fiber bundle can be suppressed from shifting in the peripheral direction by the regulating portion. Therefore, the plurality of fiber bundles can be suppressed from being wound around the liner while being shifted from the target position, and when the plurality of fiber bundles are wound around the liner, some fiber bundles can be suppressed from overlapping unintendedly or a gap in the peripheral direction can be suppressed from forming between the fiber bundles.

The above and other elements, features, steps, characteristics and advantages of our devices will become more apparent from the following detailed description of preferred examples with reference to the attached drawings.

DETAILED DESCRIPTION

While preferred examples have been described above, it is to be understood that variations and modifications will be apparent to those skilled in the art without departing from the scope and spirit of this disclosure. The scope of this disclosure and our devices, therefore, is to be determined solely by the appended claims.

Figure 1:
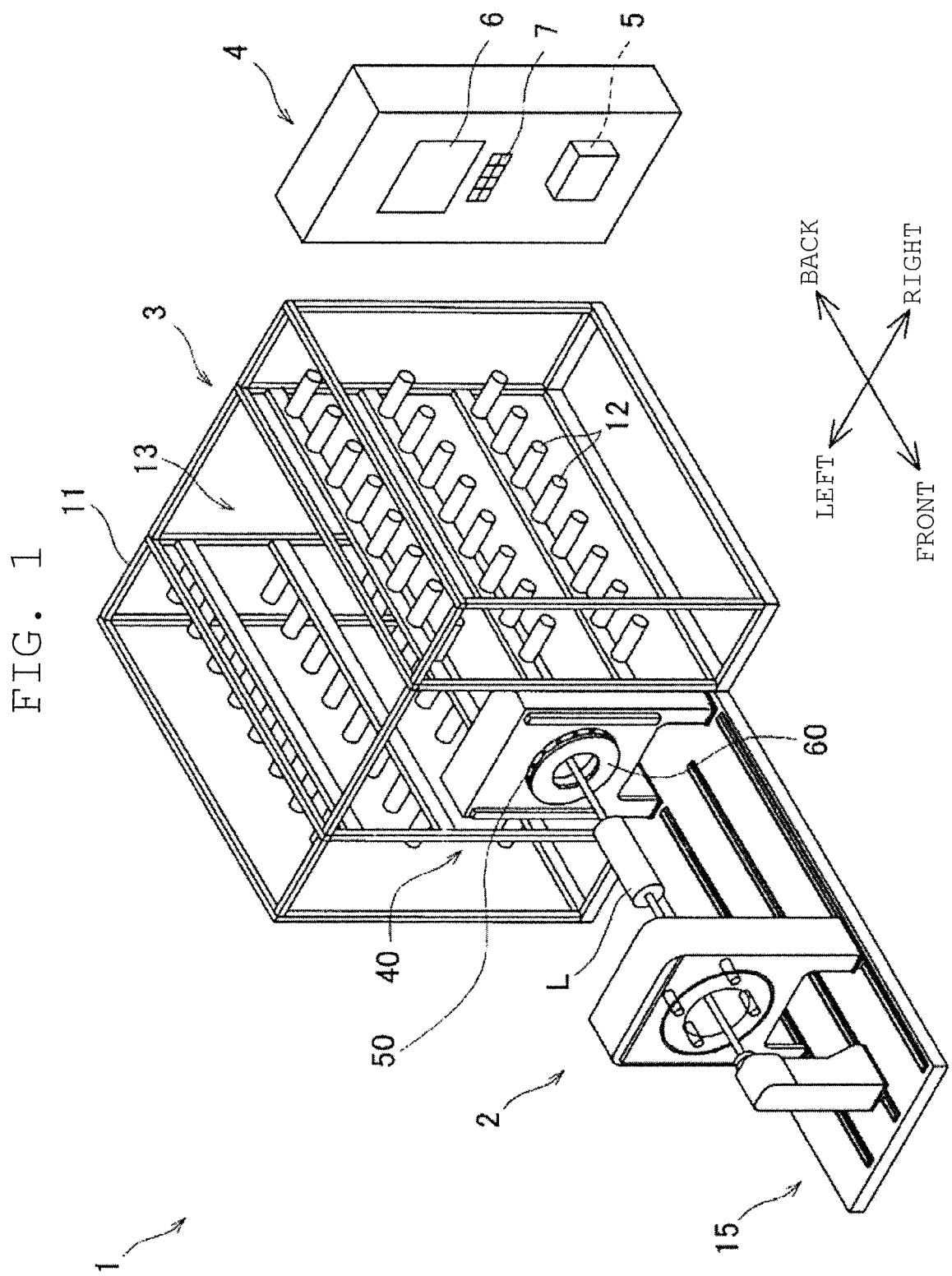
FIG. 1 is a perspective view of a filament winding device.

Next, an example will be described with reference to FIGS. 1 to 9. Directions illustrated in FIG. 1 are front and back, and left and right directions for the sake of convenience of explanation. A direction orthogonal to the front and back, and left and right directions is an up and down direction in which gravity acts.

Schematic Configuration of Filament Winding Device

First, a schematic configuration of a filament winding device 1 will be described using FIG. 1. The filament winding device 1 includes a winding device 2, a creel stand 3, and a control panel 4.

The winding device 2 is adapted to wind a fiber bundle around a liner L. The fiber bundle has, for example, a thermosetting synthetic resin material impregnated in a fiber material such as carbon fiber. The liner L, which is a winding target of the fiber bundle has, for example, a cylindrical shape. Details of the winding device 2 will be described later.

The creel stand 3 is adapted to supply the fiber bundle to a helical winding unit 40, to be described later. The creel stand 3 includes a supporting frame 11, and a plurality of bobbin supporting sections 12 supported by the supporting frame 11. The supporting frame 11 is arranged substantially symmetrically, and an arranging space 13 where one part of the winding device 2 is arranged is formed at a central portion in the left and right direction of the supporting frame 11 (illustration on the details in the arranging space 13 is omitted). A bobbin (not illustrated) around which the fiber bundle to be supplied to the helical winding unit 40 is wound is rotatably supported by the plurality of bobbin supporting sections 12.

The control panel 4 includes a control device 5, a display section 6, and an operation section 7. The control device 5 is adapted to control an operation of each section of the winding device 2. The display section 6 displays winding conditions, and the like of the fiber bundle on the liner L by the winding device 2. An operator inputs the winding conditions, and the like to the control device 5 through the operation section 7.

Configuration of Winding Device

Figure 2:
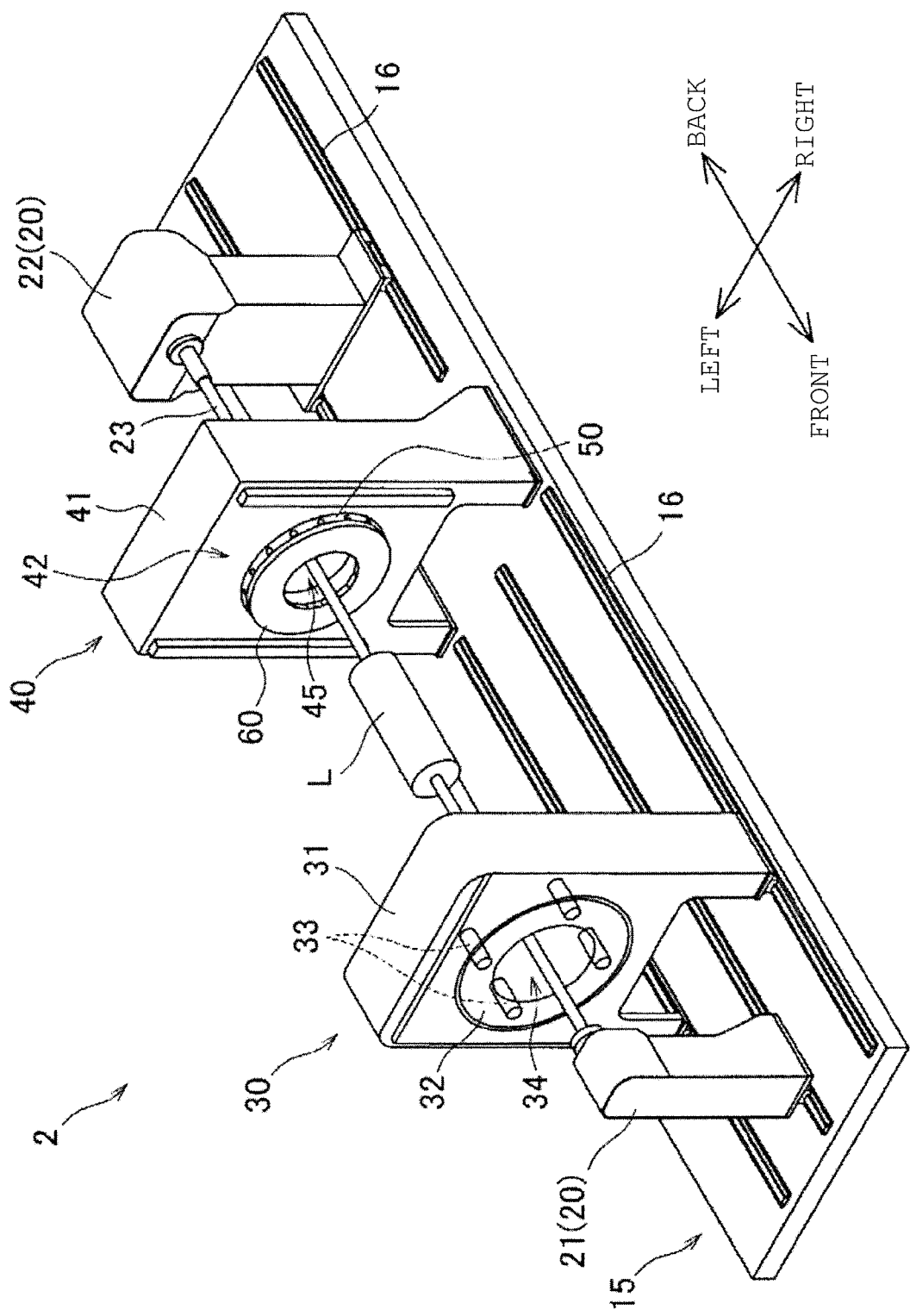
FIG. 2 is a perspective view of a winding device.

Next, a configuration of the winding device 2 will be described using FIGS. 2 and 3. The winding device 2 includes a base 15, a supporting unit 20 (supporting section, first supporting unit 21 and second supporting unit 22), a hoop winding unit 30, and the helical winding unit 40.

The base 15 is adapted to support the supporting unit 20, the hoop winding unit 30, and the helical winding unit 40 (helical winding head). The base 15 is extended in the front and back direction (axial direction of the liner L). On the base 15, the first supporting unit 21, the hoop winding unit 30, the helical winding unit 40, and the second supporting unit 22 are arranged side by side in the front and back direction in such order from the front side. A plurality of rails 16 extending in the front and back direction are arranged on an upper surface of the base 15. The supporting unit 20 and the hoop winding unit 30 are arranged on the rails 16 and are configured to be movable in the front and back direction along the rails 16. The helical winding unit 40 is fixed to the base 15 at a front end of the arranging space 13 of the creel stand 3 as shown in FIG. 1.

The supporting unit 20 includes a first supporting unit 21 arranged on the front side than the hoop winding unit 30, and a second supporting unit 22 arranged on the back side than the helical winding unit 40. The supporting unit 20 rotatably supports the liner L with a supporting shaft 23 extending in the front and back direction (axial direction of the liner L) as a center. The supporting unit 20 includes a moving motor 24 adapted to move the supporting unit 20 in the front and back direction along the rails 16, and a rotating motor 25 adapted to rotate the liner L (see FIG. 3). The moving motor 24 and the rotating motor 25 are drive-controlled by the control device 5.

The hoop winding unit 30 carries out hoop winding (winding the fiber bundle in a direction substantially orthogonal to the axial direction of the liner L) of the fiber bundle with respect to the liner L. The hoop winding unit 30 includes a main body section 31 and a rotation member 32. The main body section 31 is arranged on the rails 16, and adapted to rotatably support the rotation member 32 about an axis of the liner L. The rotation member 32 is a member having a circular plate shape. A circular passing hole 34, through which the liner L can be passed, is formed at a radially central portion of the rotation member 32. A plurality of bobbins 33, around each of which the fiber bundle is wound, are attached to the hoop winding unit 30. The plurality of bobbins 33 are arranged at an equal interval in the peripheral direction of the rotation member 32.

Figure 3:
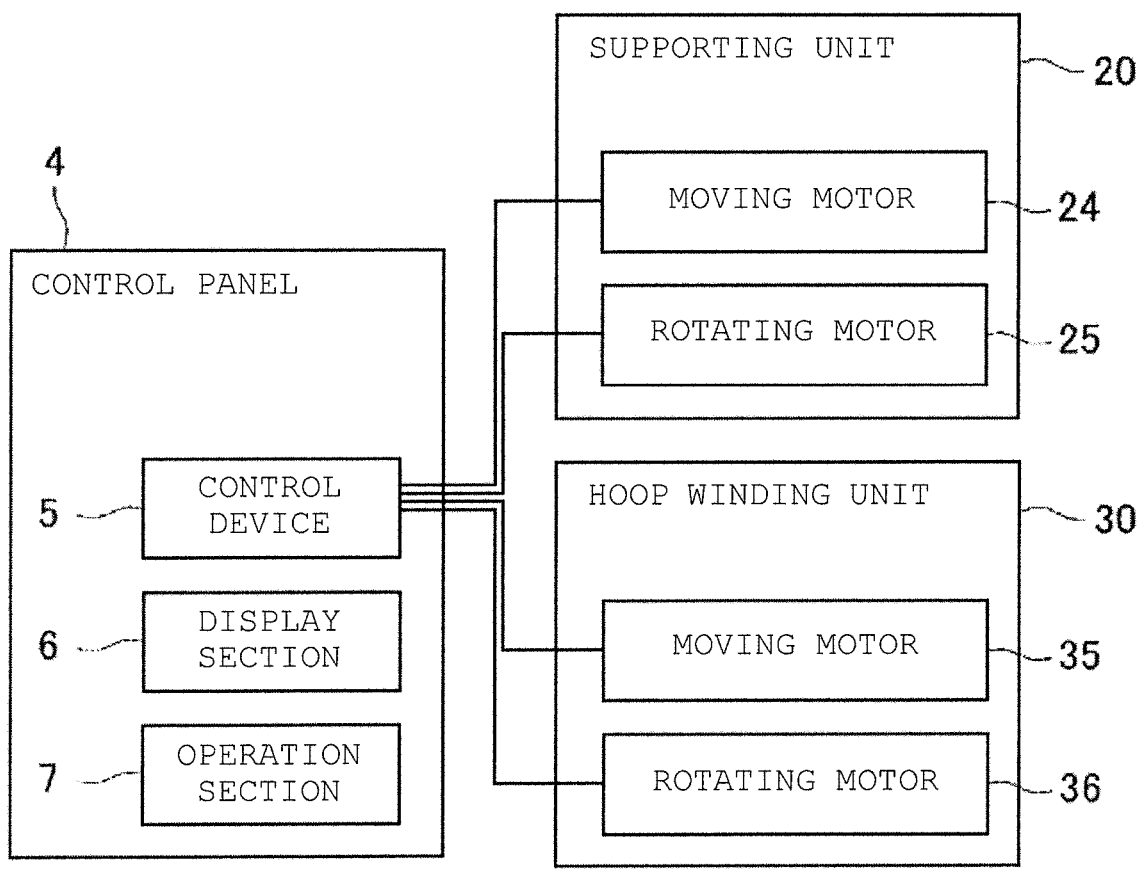
FIG. 3 is a block diagram illustrating an electrical configuration of the filament winding device.

As illustrated in FIG. 3, the hoop winding unit 30 includes a moving motor 35 adapted to move the hoop winding unit 30 in the front and back direction along the rails 16, and a rotating motor 36 adapted to rotate the rotation member 32. The moving motor 35 and the rotating motor 36 are drive controlled by the control device 5. The control device 5 rotates the rotation member 32 while reciprocating the hoop winding unit 30 along the rails 16 so that the liner L relatively passes through the passing hole 34. The plurality of bobbins 33 thereby revolve about the axis of the liner L, and the plurality of fiber bundles are pulled out from the plurality of bobbins 33. The pulled out plurality of fiber bundles are concurrently hoop wound on a surface of the liner L.

The helical winding unit 40 carries out the helical winding (winding the fiber bundle in a direction substantially parallel to the front and back direction) of the fiber bundle with respect to the liner L. The helical winding unit 40 includes a main body section 41, a guide section 42 and the like. The main body section 41 is arranged in an upright manner on the base 15. The guide section 42 is adapted to guide the plurality of fiber bundles to the liner L. The guide section 42 is attached to a front end of the main body section 41. A circular passing hole 45, through which the liner L can be passed in the front and back direction, is formed at a central portion in the left and right direction of the main body section 41 and the guide section 42. Each of fiber bundles pulled out from the plurality of bobbins arranged in the creel stand 3 is guided to the liner L through the guide section 42. Details of the helical winding unit 40 will be described later.

The control device 5 controls the rotating motor 25 to rotate the liner L while reciprocating the supporting unit 20 along the rails 16 so that the liner L passes through the passing hole 45. The plurality of fiber bundles are thereby concurrently helical wound on the surface of the liner L.

When starting a winding operation of the fiber bundle on the liner L with the winding device 2, for example, an operator first fixes a yarn end of the fiber bundle to the liner L with a tape and the like. Alternatively, a device that automates fixing the yarn end of the fiber bundle and the like may be provided. After the yarn end of the fiber bundle is fixed to the liner L, the control device 5 drive controls each motor 24, 25, 35, 36 (see FIG. 3). Thus, the hoop winding can be performed by the hoop winding unit 30 and the helical winding can be performed by the helical winding unit 40 with respect to the liner L supported by the supporting unit 20.

Helical Winding Unit

Figure 4:
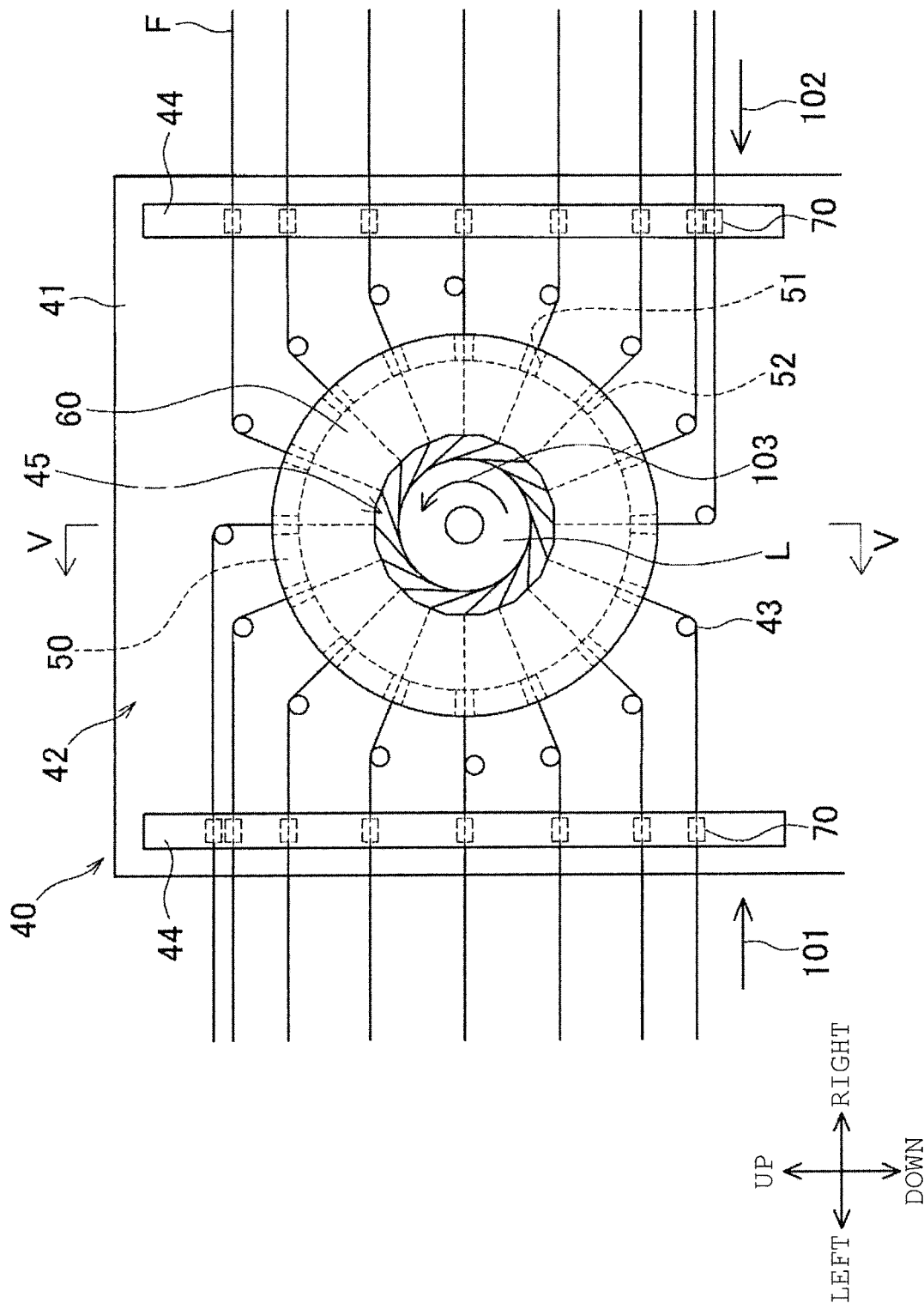
FIG. 4 is a front view of an upper side portion of a helical winding unit.
Figure 5:
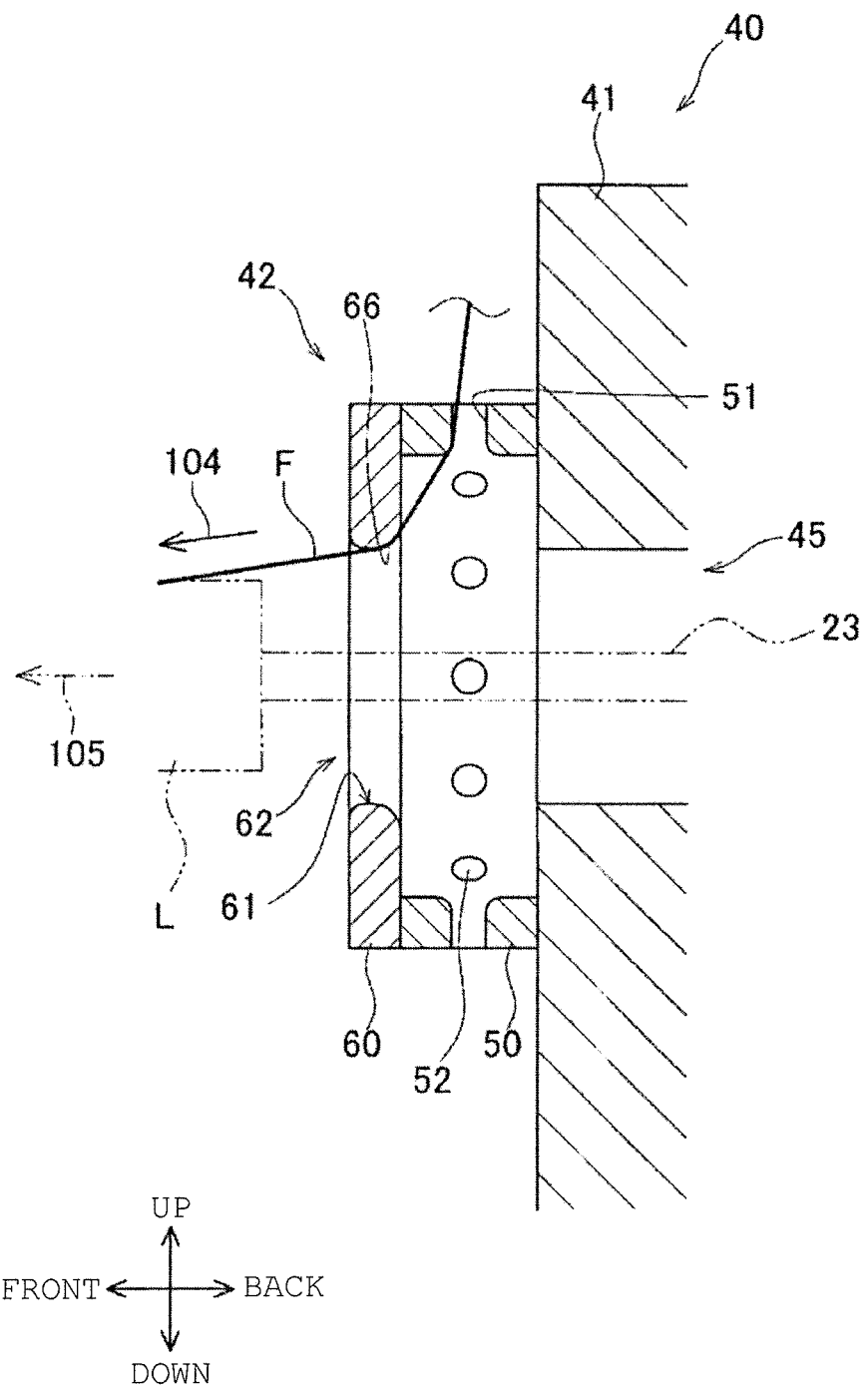
FIG. 5 is a cross-sectional view taken along line V-V of FIG. 4.
Figure 6:
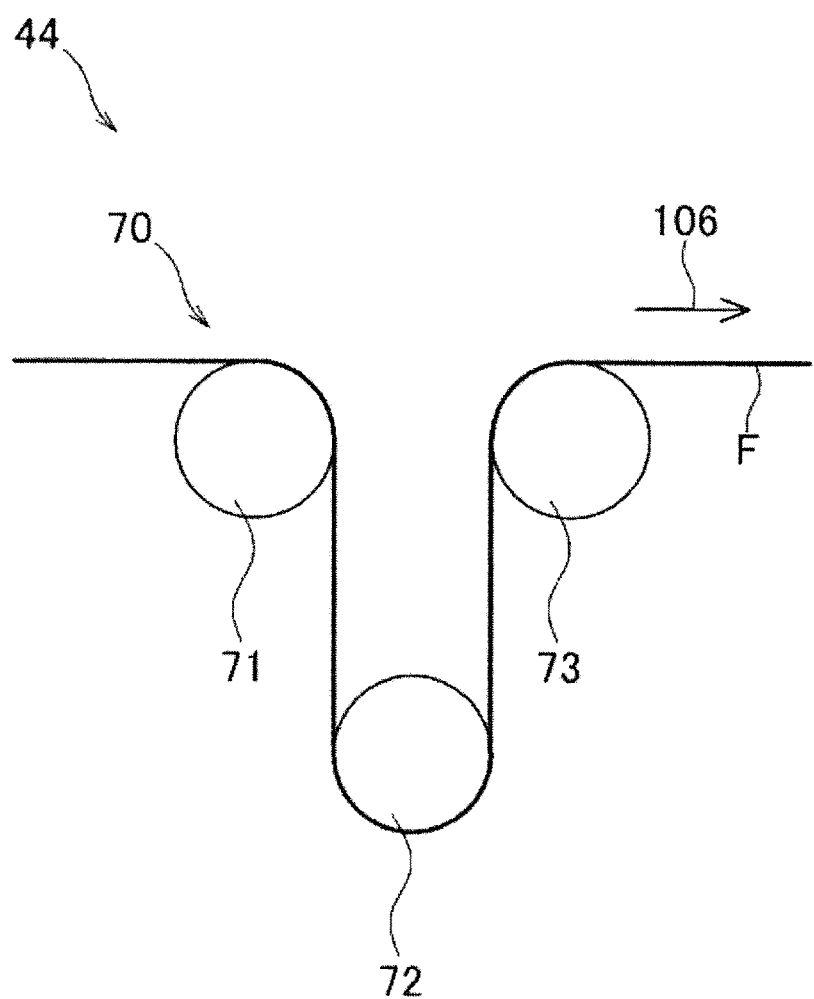
FIG. 6 is a schematic view of a tension applying section.

Next, details of the helical winding unit 40 will be described using FIGS. 4 to 6. FIG. 4 is a front view of the helical winding unit 40. FIG. 5 is a cross-sectional view taken along line V-V of FIG. 4; FIG. 6 is a schematic view of a tension applying section 70, to be described later.

As illustrated in FIG. 4, the helical winding unit 40 includes the main body section 41, the guide section 42, a plurality of auxiliary guides 43, and a tension applying device 44. The guide section 42, the plurality of auxiliary guides 43, and the tension applying device 44 are arranged on a front surface of the main body section 41. In a travelling direction (see arrows 101 and 102 of FIG. 4, and arrow 104 of FIG. 5) of the plurality of fiber bundles F, the tension applying device 44, the plurality of auxiliary guides 43, and the guide section 42 are arranged in such order from the upstream. The helical winding unit 40 guides the plurality of fiber bundles F to the liner L through the plurality of auxiliary guides 43 and the guide section 42, while the tension applying device 44 is applying a predetermined tension on the plurality of fiber bundles F to wind the plurality of fiber bundles F around the liner L. The helical winding unit 40 is configured to be able to wind 16 fiber bundles F around the liner L all at once, for example, but is not limited thereto.

As illustrated in FIGS. 4 and 5, the guide section 42 includes a guide member 50 and an opening member 60. The guide member 50 is a ring shaped member and is attached to a front end of the main body section 41. A plurality of (16 in this example) openings 51 are formed on a peripheral surface of the guide member 50. The 16 openings 51 configure 16 guides 52 (fiber bundle guide) to guide each of the fiber bundles F to the liner L. The 16 guides 52 are arrayed at equal interval in the peripheral direction of the liner L (hereinafter simply referred to as peripheral direction). Each of the 16 fiber bundles F are guided to the liner L by the 16 guides 52.

The opening member 60 rubs and opens (i.e., flattens and spreads the width) the fiber bundle F guided to the liner L by the guide member 50. The opening member 60 is, for example, a circular plate shaped metal member. As illustrated in FIG. 5, the opening member 60 is attached to a front end of the guide member 50. The opening member 60 is arranged downstream of the plurality of guides 52 in the travelling direction of the fiber bundle F. The opening member 60 includes an inner peripheral surface 61, and a hole 62 that allows the plurality of fiber bundles F to be inserted from the back side (one side) to the front side (other side) is formed by the inner peripheral surface 61. The details of the opening member 60 will be described later.

As illustrated in FIG. 4, the plurality of auxiliary guides 43 are arranged on an outer side than the plurality of guides 52 in a radial direction of the liner L. The plurality of auxiliary guides 43 guide the plurality of fiber bundles F applied with tension by the tension applying device 44 toward the guide 52.

The tension applying device 44 applies a predetermined tension on the plurality of fiber bundles F. One tension applying device 44 is attached to, for example, both left and right sides of the front end of the main body section 41. The two tension applying devices 44 each includes eight tension applying sections 70 as shown in FIG. 4 adapted to apply tension to the eight fiber bundles F. As illustrated in FIG. 6, for example, each tension applying section 70 includes three rollers 71, 72, 73, around which the fiber bundle F is placed, in order from the upstream in the travelling direction (as shown by arrow 106 of FIG. 6) of the fiber bundle F. The rollers 71, 72, 73 are configured to be rotated accompanying the travelling of the fiber bundle F. The roller 72 arranged between the roller 71 and the roller 73 in the travelling direction of the fiber bundle F is configured such that, for example, a magnitude of a torque necessary for driven-rotating can be adjusted. That is, for the roller 72 to be rotated, the torque of greater than or equal to a predetermined magnitude (i.e., frictional force of greater than or equal to predetermined magnitude generated between the fiber bundle F and the roller 72) is required. In other words, the fiber bundle F downstream of the tension applying device 44 can travel by being pulled at a predetermined force or greater. The predetermined tension is thus applied on the fiber bundle F as the fiber bundle F travels in such manner.

In the helical winding unit 40 having the above configuration, the fiber bundle F is applied with tension by the tension applying device 44, and guided to the opening member 60 through the auxiliary guides 43 and the guide 52 as shown by FIGS. 4 and 5. The fiber bundle F guided to the opening member 60 is rubbed and opened by the inner peripheral surface 61. The opened fiber bundle F is guided to the liner L by the opening member 60, and wound around the liner L moving forward (as shown by arrow 105 of FIG. 5) while rotating (as shown by arrow 103 of FIG. 4). In other words, the plurality of fiber bundles F are brought into contact with the opening member 60 while travelling in the front and back direction.

Detailed Configuration of Opening Member

Figure 7A:
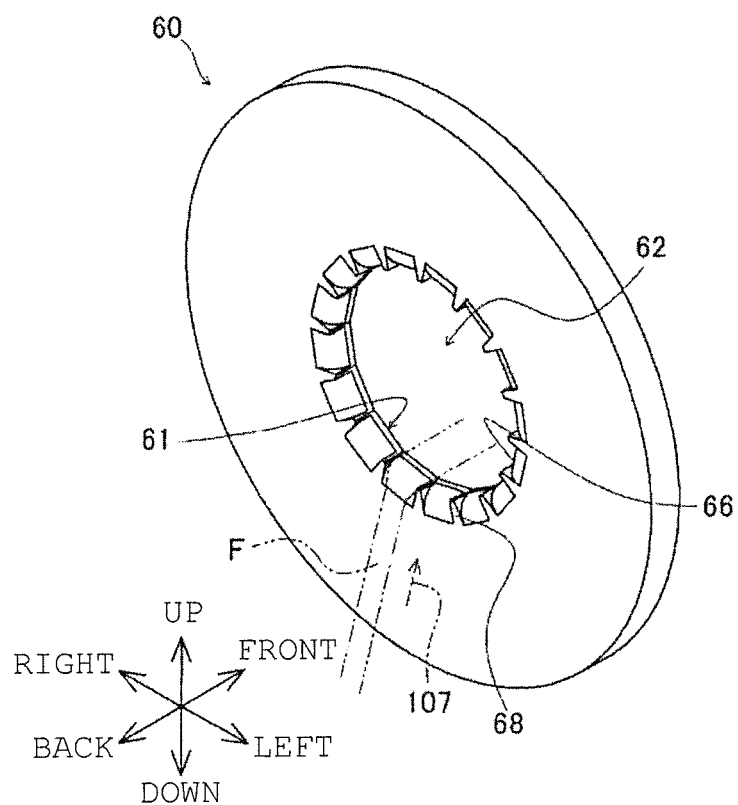
FIG. 7A is a perspective view of an opening member.
Figure 7B:
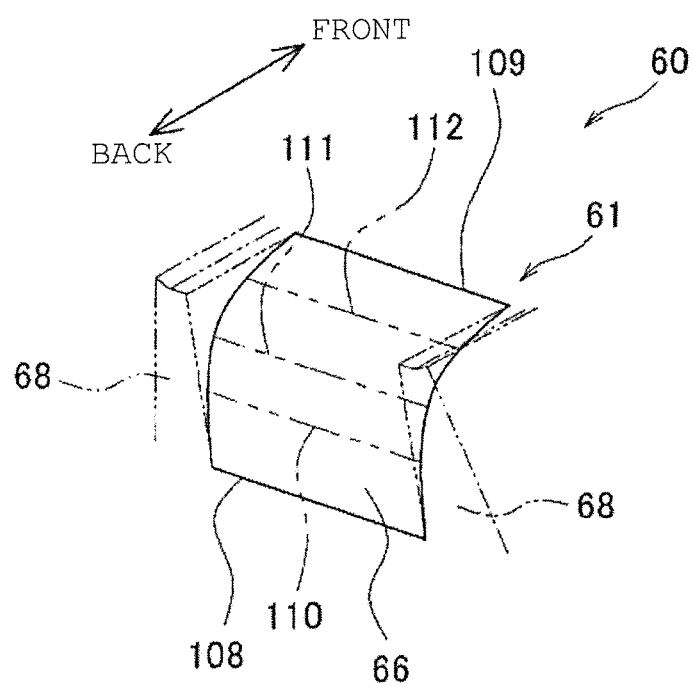
FIG. 7B is an enlarged view of an opening surface.
Figure 8A:
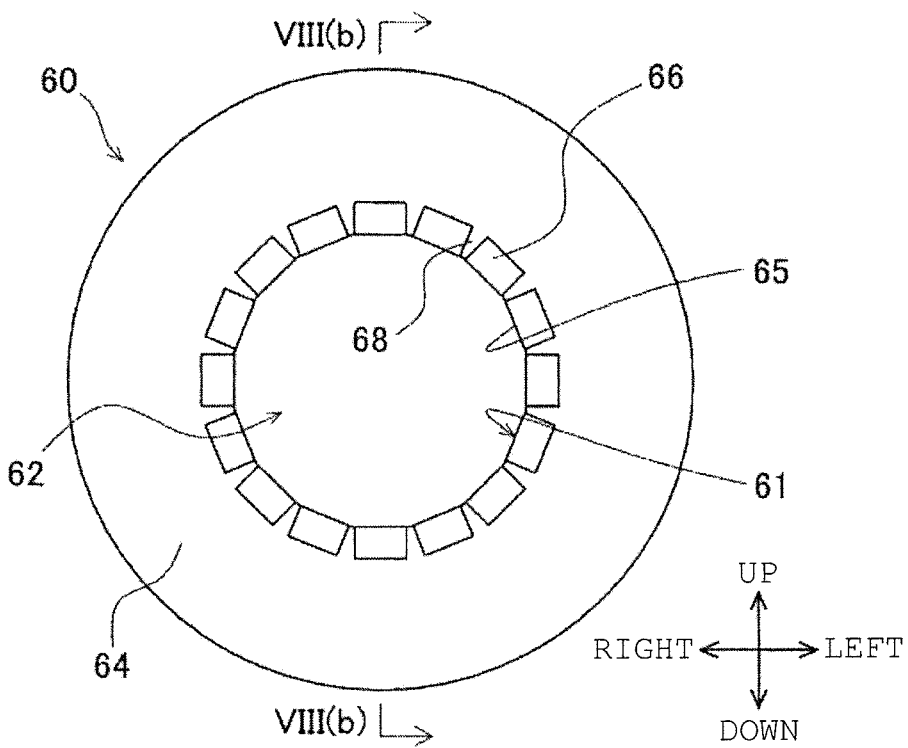
FIG. 8A is a rear view of the opening member.
Figure 8B:
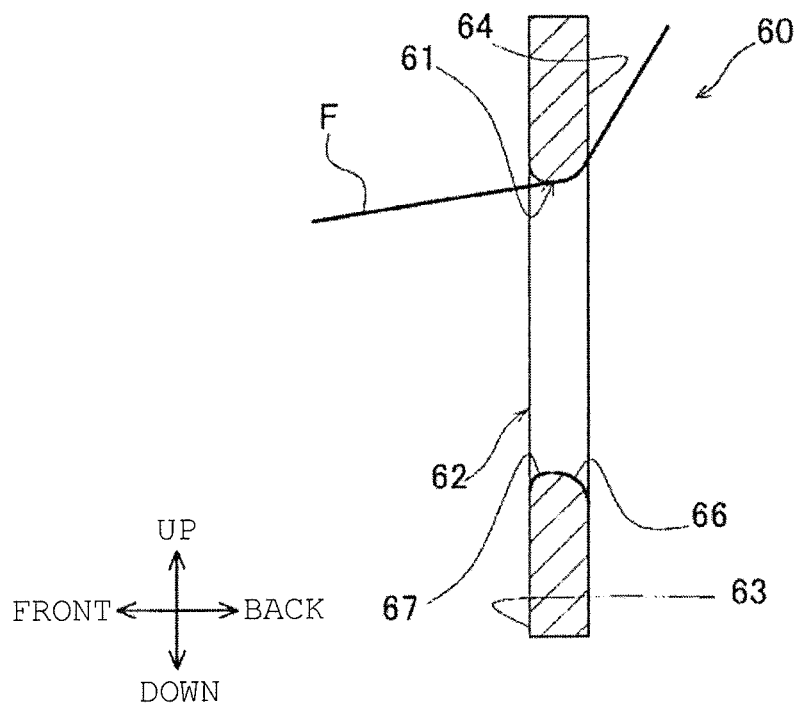
FIG. 8B is a cross-sectional view taken along line VIII(b)-VIII(b) of FIG. 7A.

Next, a description will be made on a detailed configuration of the opening member 60 of the first example using FIGS. 7 and 8. FIG. 7A is a perspective view of the opening member 60 seen from a back end side. FIG. 7B is an enlarged view of one of a plurality of opening surfaces 66, to be described later. FIG. 8A is a rear view of the opening member 60. FIG. 8B is a cross-sectional view taken along line VIII(b)-VIII(b) of FIG. 8A.

As illustrated in FIGS. 7A and 8A, the inner peripheral surface 61 of the opening member 60 includes 16 opening surfaces 66 arrayed at equal interval in the peripheral direction. The 16 opening surfaces 66 guide the 16 fiber bundles F travelling in the front and back direction to the liner L while rubbing each of the fiber bundles. The number of opening surfaces 66 is equal to the number of fiber bundles F guided to the liner L all at once, similar to the guide 52 as shown in FIG. 4 of the guide member 50 described above.

The shape of the opening surface 66 will be described. The opening surface 66 is extended from a back end face 64 (as shown in FIG. 8B) of the opening member 60 toward the front side and the radially inner side up to a middle portion in the front and back direction of the inner peripheral surface 61 as shown by the thick line of FIG. 8B. As illustrated in FIG. 8B, the opening surface 66 has an R shape smoothly curved from the back end face 64 toward the front side and the radially inner side. More specifically, the opening surface 66 is shaped such that a distance to a center in the radial direction of the inner peripheral surface 61 becomes smaller and is convex toward the center in the radial direction of the inner peripheral surface 61 from the back side toward the front side. A front side portion 67 (as shown by the thick line of FIG. 8B) of the inner peripheral surface 61 also has an R shape from a front end face 63 toward the back side.

Furthermore, as illustrated in FIG. 7B, a line orthogonal to the front and back direction of the opening surface 66 is linear at any position in the front and back direction as shown by solid lines 108, 109 and chain double dashed lines 110 to 112. In other words, a cross-section orthogonal to the front and back direction of the opening surface 66 is in a linear form. That is, the fiber bundle F (as shown in FIG. 7A) passing through the hole 62 of the opening member 60 in the front and back direction can travel in the direction orthogonal to the linear portion of the opening surface 66. Therefore, the opening surface 66 is in a linear form in the direction (peripheral direction) orthogonal to the front and back direction, and curved in the front and back direction.

As described above, the inner peripheral surface 61 of the opening member 60 has a configuration in which 16 opening surfaces 66 are arranged side by side in the peripheral direction. That is, as illustrated in FIG. 8A, the inner peripheral surface 61 has a hexadecagon shape when the opening member 60 is seen from the front and back direction. Each side 65 of the hexadecagon is included in each opening surface 66. In other words, each side 65 configures each opening surface 66.

Furthermore, as illustrated in FIGS. 7A and 8A, a protrusion 68 (regulating portion) is provided between two opening surfaces 66 adjacent to each other in the peripheral direction. The protrusion 68 regulates the fiber bundle F travelling while making contact with the opening surface 66 from moving in the peripheral direction. The protrusion 68 is alternately lined with the opening surface 66 in the peripheral direction. In other words, each opening surface 66 is sandwiched by two protrusions 68 in the peripheral direction. The protrusion 68 is projected out toward the radially inner side than the back end (as shown by solid line 108 of FIG. 7B) of the opening surface 66, and is projected toward the back side than a radially inner side end (as shown by solid line 109 of FIG. 7B) of the opening surface. The protrusion 68 is formed by one part of the opening member 60. The protrusion 68 is formed simultaneously with the formation of the opening surface 66 when, for example, the radially inner side portion of the back end of the opening member 60 is scraped during the manufacturing.

Opening of Fiber Bundle by Opening Member

Figure 9A:
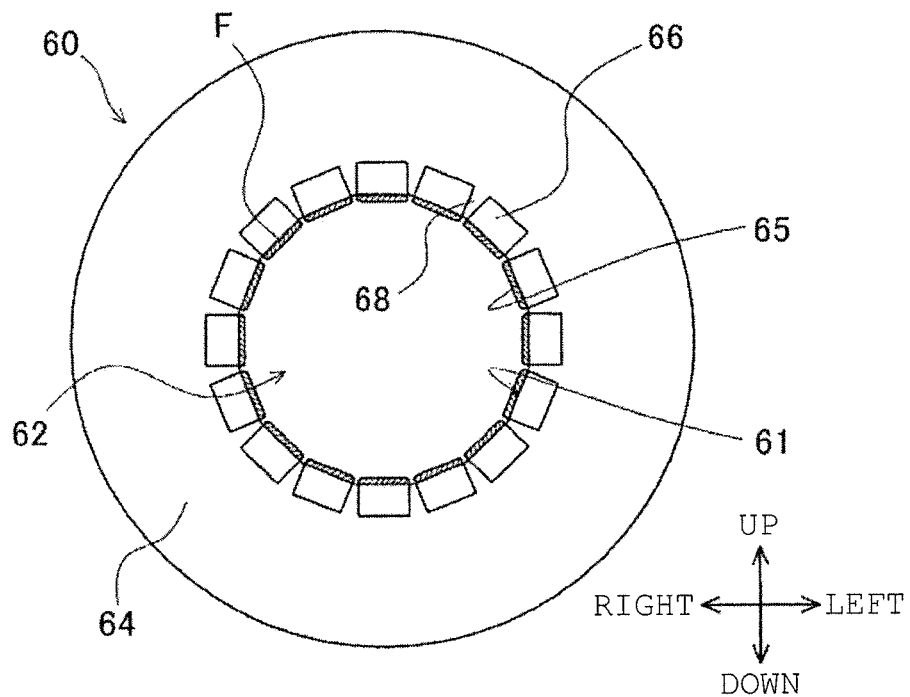
FIG. 9A is a view illustrating the opening member and the fiber bundle opened by the opening member.
Figure 9B:
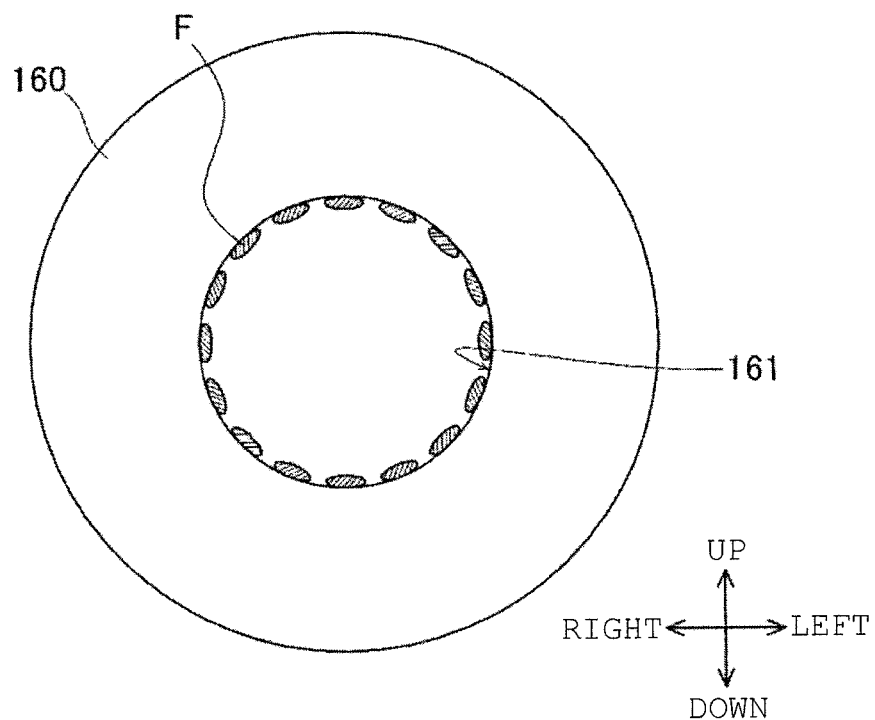
FIG. 9B is a view illustrating the opening member and the fiber bundle opened by the opening member.

Next, a description will be made on the opening of the fiber bundle F by the opening member 60 having the configuration described above using FIGS. 7A and 9. FIG. 9A is a view illustrating the opening member 60 and a cross-section of the fiber bundle F opened by the opening member 60. FIG. 9B is a view illustrating an opening member 160 and a cross-section of the fiber bundle F opened by the opening member 160 when the inner peripheral surface has a circular cross-section.

As illustrated in FIG. 7A, the fiber bundle F travels from the back side of the opening member 60 toward the front side and the radially inner side as shown by arrow 107. As described above, the fiber bundle F is brought into contact with the opening surface 66 of the inner peripheral surface 61 while being applied with tension by the tension applying device 44, and is rubbed and opened by the opening surface 66. If the opening member is an opening member 160 having an inner peripheral surface 161 of a circular cross-section, as illustrated in FIG. 9B, the fiber bundle F will be rubbed while making contact with a circular arc shaped surface, and thus is less likely to become flat and to spread in the width direction (peripheral direction) even if opened. Thus, a gap may easily form between the fiber bundles F in the peripheral direction. As the opening member 60 of this example has a linear cross-section orthogonal to the front and back direction of the opening surface 66, the opened fiber bundle F is easily flattened and easily spread greatly in the width direction, as illustrated in FIG. 9A.

Furthermore, as described above, the opening surface 66 has a curved shape in the front and back direction. Hence, the fiber bundle F smoothly travels along the opening surface 66. Thus, the damage of the fiber bundle F that occurs when the fiber bundle F is rubbed against the opening surface 66 is suppressed. Furthermore, since the protrusion 68 is formed between two opening surfaces 66 in the peripheral direction, the fiber bundle F is regulated from moving in the peripheral direction. Thus, the fiber bundle F can be suppressed from shifting from the opening surface 66.

As described above, the cross-section orthogonal to the front and back direction of the opening surface 66 is in a linear form. Hence, the fiber bundle F brought into contact with the opening surface 66 while travelling in the front and back direction can be flattened, and each fiber bundle F can be greatly spread in the width direction. Therefore, the width of the fiber bundle F can be easily spread at the time of the opening.

Furthermore, as each side 65 of a polygon formed in the inner peripheral surface 61 configures each opening surface 66, the entire inner peripheral surface 61 can be utilized as the opening surface 66. Thus, the opening surface 66 can be made large as much as possible in the peripheral direction, and the fiber bundle F can be spread as much as possible at the time of the opening. Moreover, as the number of opening surfaces 66 and the number of guides 52 are equal, the plurality of opening surfaces 66 and the plurality of fiber bundles F can be corresponded one on one, whereby one fiber bundle F can be rubbed with one opening surface 66. Thus, the plurality of fiber bundles F can be lined without a gap in the peripheral direction, and the plurality of fiber bundles F can be easily wound around the liner L evenly.

Furthermore, as the plurality of fiber bundles F do not need to be commonly rubbed with only one opening surface 66, the fiber bundles F can be suppressed from interfering with each other.

Each opening surface 66 has a convex curved shape toward the center in the radial direction in the front and back direction. Thus, the fiber bundle F travelling in the front and back direction can be arranged to smoothly lie along the opening surface 66. Therefore, the damage of the fiber bundle F can be suppressed.

Moreover, the fiber bundle F can be suppressed from shifting in the peripheral direction by the protrusion 68. Therefore, the plurality of fiber bundles F can be suppressed from being wound around the liner L in a state shifted from a target position. Furthermore, when the plurality of fiber bundles F are wound around the liner L, some fiber bundles F can be suppressed from overlapping unintendedly. Moreover, a spacing in the peripheral direction can be suppressed from forming between some fiber bundles F.

Next, an alternative example in which the first example is modified will be described. However, the same reference symbols are denoted on configurations similar to the example described above, and the description thereof will be appropriately omitted.

In the first example, the inner peripheral surface 61 of the opening member 60 has a hexadecagon shape when seen from the front and back direction, but this is not the sole case. In other words, the number of sides 65 may be changed according to the number of fiber bundles F to be wound around the liner L at one time. Alternatively, the inner peripheral surface 61 may not be a polygonal shape when seen from the front and back direction. In other words, the shape of the cross-section orthogonal to the front and back direction of the opening surface 66 merely needs to be in a linear form, and the cross-section of other portions may be in a curved line form.

Figure 10:
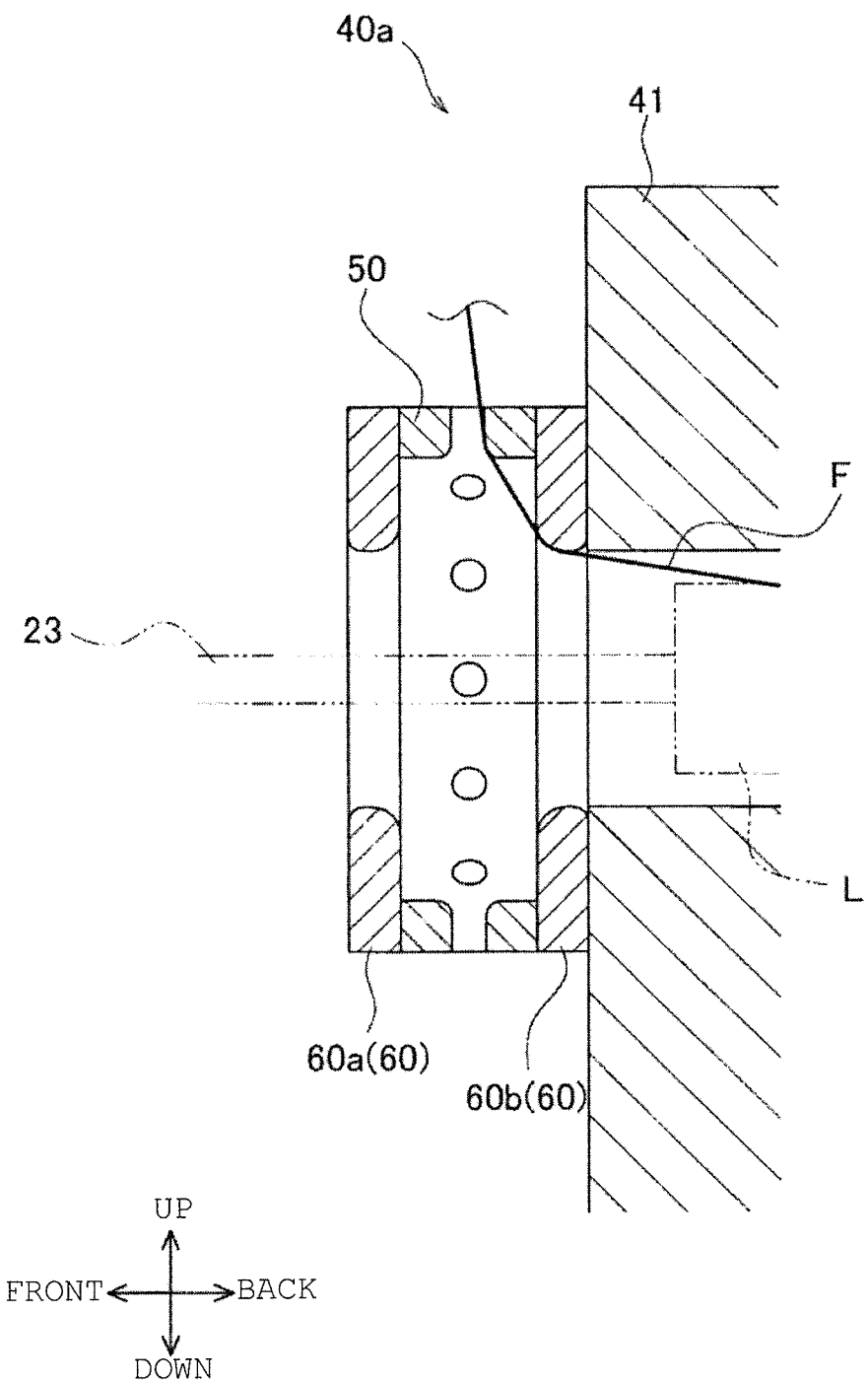
FIG. 10 is a side view of a helical winding unit according to an alternative example.

In the first example, the opening member 60 is attached to the front end of the guide member 50, but this is not the sole case. For example, as illustrated in FIG. 10, the opening member 60 may be attached to both front and back sides of the guide member 50 in a helical winding unit 40a. An opening member 60a attached to the front end of the guide member 50 and an opening member 60b attached to the back end of the guide member 50 (i.e., between the guide member 50 and the main body section 41 in the front and back direction) are front and back symmetrical. In such a configuration, the opening member 60 to be used can be switched according to the direction (front side, back side) of passing the liner L.

In the first example, the protrusion 68 provided between two opening surfaces 66 adjacent to each other in the opening member 60 is formed by one part of the opening member 60, but this is not the sole case. In other words, a regulating portion adapted to regulate the movement of the fiber bundle F in the peripheral direction and the opening member 60 may be formed by separate members.

In the first example, the regulating portion such as the protrusion 68 is provided between two opening surfaces 66 adjacent to each other in the opening member 60, but this is not the sole case. In other words, the regulating portion may not be provided.

In the first example, the opening surface 66 of the opening member 60 has an R shape, but this is not the sole case. In other words, the opening surface 66 may have a curved shape other than the R shape. Alternatively, the opening surface 66 may not necessarily have a curved shape and, for example, may have a planar shape with an inclination with respect to the axial direction.

In the first example, the number of opening surfaces 66 of the opening member 60 and the number of guides 52 of the guide member 50 are equal, but such numbers may be different from each other. For example, the number of opening surfaces 66 may be less than the number of fiber bundles F to be wound around the liner L at one time. Furthermore, if the number of fiber bundles F to be wound around the liner L at one time is large, a configuration of commonly rubbing the plurality of fiber bundles F with one opening surface 66 may be adopted.

The configuration of the tension applying device 44 is not limited to that illustrated in FIG. 6, and merely needs to be a configuration capable of applying tension on the fiber bundle F. Furthermore, the tension applying device 44 may not necessarily be attached to the helical winding unit 40.

What is claimed is:

1. A filament winding device comprising:
   a supporting section adapted to rotatably support a liner and be movable in an axial direction of the liner; and
   a helical winding head adapted to helical wind a plurality of fiber bundles on the liner moving in the axial direction while rotating;
   wherein the helical winding head includes,
   a plurality of fiber bundle guides arrayed in a peripheral direction of the liner, and adapted to guide each of the plurality of fiber bundles supplied to the helical winding head to the liner, and
   an opening member arranged downstream of the plurality of fiber bundle guides in a travelling direction of the fiber bundle, and including an inner peripheral surface to form a hole through which the plurality of fiber bundles are inserted from one side to the other side in the axial direction, wherein
   the inner peripheral surface has a polygonal shape when viewed from the axial direction;
   each side of the polygon configures each opening surface;
   a plurality of opening surfaces to which the plurality of fiber bundles travelling from the one side to the other side in the axial direction make contact are formed on the inner peripheral surface of the opening member, and a number of the plurality of opening surfaces is equal to a number of the plurality of fiber bundle guides; and
   a shape of a cross-section orthogonal to the axial direction of each opening surface is linear.

2. The filament winding device according to claim 1, wherein each opening surface has a curved shape in which a distance to a center in a radial direction of the inner peripheral surface becomes smaller and is convex toward the center in the radial direction from the one side toward the other side in the axial direction.

3. The filament winding device according to claim 2, wherein a regulating portion adapted to regulate movement of the fiber bundle in the peripheral direction is provided between two of the opening surfaces adjacent to each other in the peripheral direction.

4. The filament winding device according to claim 1, wherein a regulating portion adapted to regulate movement of the fiber bundle in the peripheral direction is provided between two of the opening surfaces adjacent to each other in the peripheral direction.

5. A filament winding device comprising:
   a supporting section adapted to rotatably support a liner and be movable in an axial direction of the liner; and a helical winding head adapted to helical wind a plurality of fiber bundles on the liner moving in the axial direction while rotating;

wherein the helical winding head includes, a plurality of fiber bundle guides arrayed in a peripheral direction of the liner, and adapted to guide each of a plurality of fiber bundles supplied to the helical winding head to the liner, and an opening member arranged downstream of the plurality of fiber bundle guides in a travelling direction of the fiber bundle, and including an inner peripheral surface to form a hole through which the plurality of fiber bundles are inserted from one side to the other side in the axial direction;

a plurality of opening surfaces to which the plurality of fiber bundles travelling from the one side to the other side in the axial direction make contact are formed on the inner peripheral surface of the opening member; and a shape of a cross-section orthogonal to the axial direction of each opening surface is linear, and each opening surface has a curved shape in which a distance to a center in a radial direction of the inner peripheral surface becomes smaller from the one side toward the other side in the axial direction and is convex toward the center in the radial direction.

6. The filament winding device according to claim 5, wherein a regulating portion adapted to regulate movement of the fiber bundle in the peripheral direction is provided between two of the opening surfaces adjacent to each other in the peripheral direction.

\* \* \* \* \*